United States Patent [19]

Bly et al.

[11] 4,276,066
[45] Jun. 30, 1981

[54] MONOLITH DIESEL EXHAUST FILTER WITH SELF-REGENERATION

[75] Inventors: Kenneth B. Bly, Pontiac; Mark J. Gutwald; Otto A. Ludecke, both of Rochester, all of Mich.

[73] Assignee: General Motors Corporation, Detroit, Mich.

[21] Appl. No.: 124,141

[22] Filed: Feb. 25, 1980

[51] Int. Cl.³ .............................. B01D 39/20; F01N 3/02
[52] U.S. Cl. .................................... 55/287; 55/288; 55/466; 55/523; 55/DIG. 30; 60/311; 422/178
[58] Field of Search ................. 55/282, 286, 287, 301, 55/466, 523, DIG. 30, 288; 60/295, 296, 300, 311; 422/174, 178, 180; 106/40 R; 252/477 R; 428/73, 116–118

[56] References Cited

U.S. PATENT DOCUMENTS

| | | | |
|---|---|---|---|
| 3,661,529 | 5/1972 | Karolidis | 23/277 C |
| 3,758,778 | 1/1974 | Burstein et al. | 55/316 |
| 3,768,982 | 10/1973 | Kitzner et al. | 60/300 |
| 4,040,253 | 8/1977 | Dhugues et al. | 60/303 |
| 4,041,591 | 8/1977 | Noll et al. | 55/523 |
| 4,041,592 | 8/1977 | Kelm | 55/523 |
| 4,054,417 | 10/1977 | Rosebrock | 23/277 C |

FOREIGN PATENT DOCUMENTS

| | | | |
|---|---|---|---|
| 2333092 | 1/1975 | Fed. Rep. of Germany | 60/300 |
| 697345 | 9/1953 | United Kingdom | 55/287 |

Primary Examiner—David L. Lacey
Attorney, Agent, or Firm—Robert J. Outland

[57] ABSTRACT

A self-regenerating diesel engine exhaust particulate filter comprising, in a preferred embodiment, porous ceramic walls defining filter surfaces between adjacent inlet and outlet passages and having electric heating wires in the inlet passages to periodically initiate incineration of collected particulates therein. A movable shield is preferably provided to restrict gas flow through the various passages during their respective periods of incineration so as to provide periodic regeneration with a minimum expenditure of external energy.

5 Claims, 2 Drawing Figures

MONOLITH DIESEL EXHAUST FILTER WITH SELF-REGENERATION

TECHNICAL FIELD

This invention relates to diesel engine exhaust particulate filters and, more particularly, to wall-flow monolith-type filters including means for self-regeneration through the periodic incineration of particulates.

BACKGROUND

As a result of recent efforts to develop practical means for removing particulates from diesel engine exhaust gases in automotive vehicles, it has been found that wall-flow ceramic monolith filters can provide very efficient filtration of diesel exhaust particulates with relatively low pressure drop. U.S. Patent application Ser. No. 99,933 filed Dec. 3, 1979 in the names of Morris Berg, William Johnston and Carl Schaffer and assigned to the assignee of the present invention, discloses examples of such ceramic monolith filters.

While such filters have been shown to be highly effective in the collection of diesel exhaust particulates, it appears that the volume of particulates collectable from diesel engine exhaust products requires that exhaust filters be replaced or regenerated at frequent intervals if the size of the filter elements is limited to volumes presently considered practical. Thus, to avoid the need for frequent servicing of such a system it appears desirable to provide means for periodic regeneration of the filter element by incineration of the collected exhaust particulates at intervals during normal operation of the vehicle.

To accomplish this, it has been proposed that exhaust gases passing into the filter be periodically heated to the particulate ignition temperature. A suggested manner of such heating is the method of engine throttling proposed in U.S. Patent application Ser. No. 952,710, filed October 19, 1978, in the names of Otto Ludecke and Theodore Rosebrock, and assigned to the assignee of the present invention. However, tests have indicated that incineration of particulates in porous wall-flow ceramic monolith filters by inlet gas heating would be difficult to initiate and to complete. In addition, other proposed methods of heating would apparently require a very large expenditure of outside energy.

SUMMARY

The present invention provides arrangements for self-regenerating monolithic diesel exhaust particulate filters which provide means for periodic incineration of particulates with a reasonable expenditure of energy. The invention contemplates the provision of individual electric heating wires or elements in some or all of the inlet or other passages of a monolith filter. The heating wires are selectively energized at periodic intervals to initiate and complete incineration of particulates in their respective passages and possibly also in adjacent passages. The selective operation of the various heating elements limits the amount of electric power required and permits, if desired, continuous operation of the incineration system to occur sequentially in various portions of the element. Preferably, a shield is provided for restricting exhaust flow through those passages in which regeneration by incineration is occurring so that the heat is more effectively utilized and a reduced expenditure of energy is required.

These and other features and advantages of the invention will be more fully understood from the following descripton of certain preferred embodiments, taken together with the accompanying drawing.

BEST MODE DISCLOSURE

Figure 1:
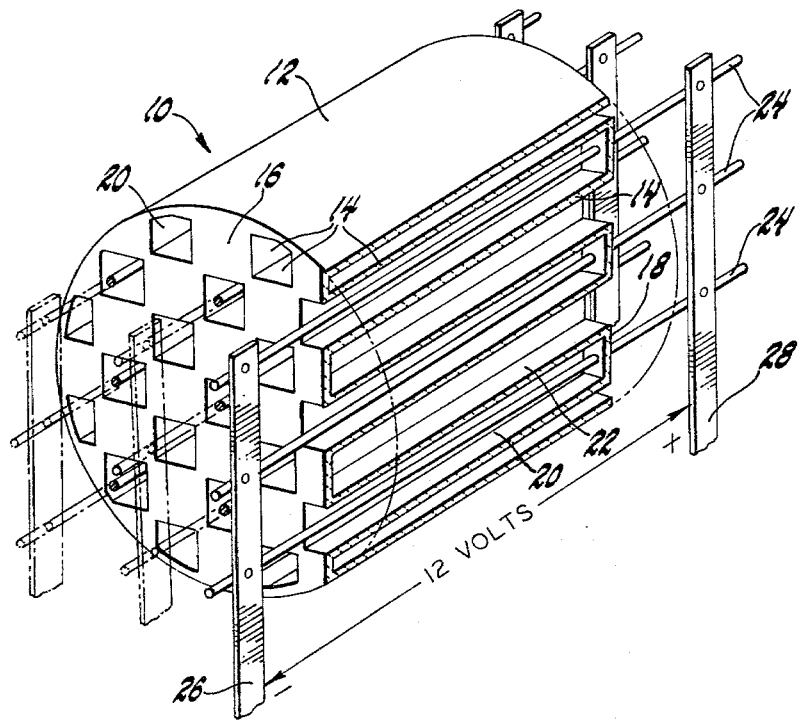
FIG. 1 is a pictorial view representationally illustrating one embodiment of self-regenerating ceramic monolith diesel exhaust particulate filter formed in accordance with the invention.

Referring now to FIG. 1 of the drawing, numeral 10 generally indicates a self-regenerating diesel exhaust particulate filter formed in accordance with certain principles of the invention. Filter 10 includes a ceramic monolith body 12 having a plurality of interconnecting porous internal walls 14. The walls define square cross-sectioned parallel passages, the alternate ends of which are plugged by end walls 16, 18 to define a plurality of adjacent inlet and outlet passages 20, 22, respectively. In the figure, the sizes of the passages are shown greatly enlarged relative to the apparent size of the filter body and are intended only to be representative of ceramic monoliths of the type described in the previously mentioned U.S. Patent application Ser. No. 99,933.

The filter 10 further includes electric heating means in the form of resistance rods or wires 24 for periodically heating and incinerating collected particulates on the porous wall surfaces of the inlet passages 20. These heating rods or wires are arranged to extend longitudinally through certain of the inlet passages 20 and to connect at their opposite ends with electric conductors 26 and 28 which are respectively connectable to the opposite poles of an electric power source, such as a battery (not shown).

If desired, groups of selectively energized heating wires may be arranged to extend through all of the inlet passages for individually heating each of the respective passages. However, in the arrangement of FIG. 1, the wires are shown extending only through alternate rows of the inlet passages. It should be understood that suitable switching means may be provided to selectively energize any of the groups of heating wires by connecting the conductors 26 and 28 of the respective group with the battery.

In operation, the electrically self-regenerating exhaust filter is disposed within a suitable housing in the exhaust system of a diesel engine powered vehicle. Exhaust gases from the engine are directed into the open ends of the inlet passages 20 from which they pass through the porous walls 14 to the outlet passages 22, escaping through the open ends thereof to an exhaust pipe (not shown). Particulates filtered from the exhaust gases collect on surfaces of the porous walls 14 which face into the inlet passages and, eventually, the collection of particulates in the respective passages build up to a point where gas flow is impeded.

Self-regeneration of the partially plugged filter is accomplished by sequentially energizing the various groups of electric heating wires, one group of heating wires being energized at a time in order to limit the amount of electrical energy required to a practical value. The energized heating wires raise the temperature of their respective inlet passages to a value between about 850° and 1500° F. in order to provide ignition and complete incineration of the particulates collected on the passage walls.

In the arrangement of FIG. 1, the transfer of heat from the directly heated intake passages to the adjacent intake passages through conduction is required since all of the passages are not provided with heating wires. However, it has been found that such heat transfer is possible within a limited area around each heating element. After regeneration of the passages surrounding one group of heating wires, the next group of wires is energized and the process continues until the whole filter unit is regenerated.

Figure 2:
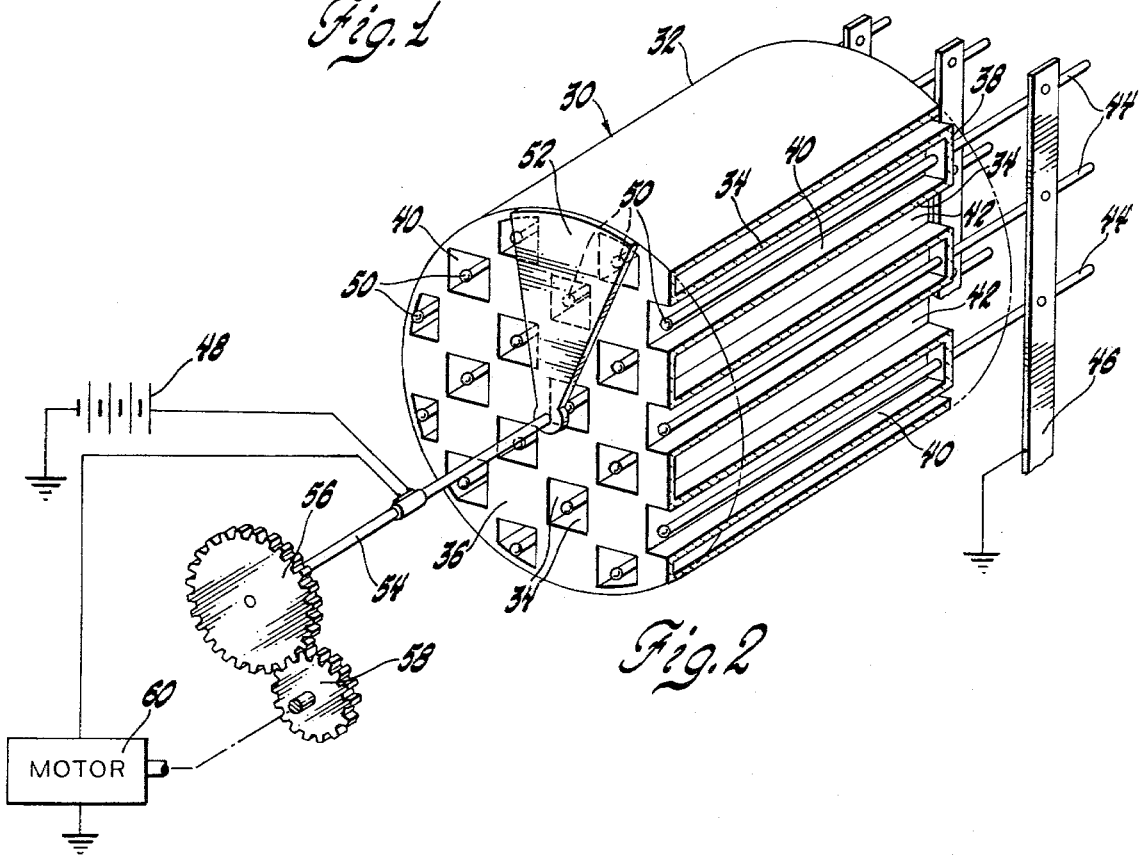
FIG. 2 is a pictorial view similarly illustrating a modified embodiment of the invention.

Referring now to FIG. 2 of the drawing, numeral 30 generally indicates an alternative embodiment of exhaust filter in accordance with the invention. Filter 30 includes a ceramic monolith body 32 constructed in generally the same manner as that of the body 12 of FIG. 1. Thus interconnecting porous internal walls 34 define parallel passages alternately closed by end walls 36 and 38 to provide alternate inlet and outlet passages 40 and 42, respectively.

The inlet passages of filter 30 are provided with heating elements in the form of rods or wires 44 which connect at the outlet end of the filter with conductors 46 connected with a source of electrical power, such as a battery 48.

At the inlet end of the filter, the heating wires 44 terminate near the filter face in electrical contacts 50. These contacts are engageable by a pie-shaped shield 52 that is mounted on one end of a rotatable shaft 54. At its other end the shaft is fixed to a gear 56 that is driven through another gear 58 by an electric motor 60. The shaft 54 and pie-shaped shielf 52 as well as the motor 60 are connected with the battery 48 which provides them with electrical power.

In use, the filter 30 and its associated components are installed in a suitable housing in the exhaust system of a diesel engine-powered vehicle. During engine operation, exhaust gas flows from the inlet passages 40 to the outlet passages 42 through the porous walls 34, leaving exhaust particulates collected on the inlet passage sides of the walls.

Continuously or periodically during engine operation, the electric motor 60 is energized to rotate the shield 52 which is charged by the battery 48. As the shield rotates, it periodically engages the contacts 50 on the ends of various heating wires 44, completing electrical circuits from the battery through the shaft 54 and shield 52 to the engaged heating wires 44 and back to the battery through the grounded conductors 46. Concurrently, the shield 52 blocks much of the flow of exhaust gas through the particulate inlet passages in which the energized heating wires are located. Thus less of the heat generated by the heating wires is carried away by flowing exhaust gas and more is absorbed by the passage walls. In this way, these collected particulates are more rapidly ignited and incinerated with a lesser expenditure of energy. Continued operation of the motor rotates the shield around the complete face of the filter element, thus sequentially providing for shielded incineration of the particulates in all of the inlet passages.

While the invention has been described by reference to certain specific embodiments chosen for purposes of illustration, it should be understood that details of construction and form of the illustrated figures are intended to only represent some of the many ways in which self-cleaning or regenerating exhaust particulate filters may be constructed in accordance with the principles of the present invention. Since numerous changes may be made without departing from the disclosed principles, it is intended that the invention not be limited to the embodiments illustrated, but that it have the full scope permitted by the language of the following claims.

The embodiments of the invention for which an exclusive property or privilege is claimed is set forth in the following claims.

1. A self-regenerating monolithic exhaust particulate filter for diesel engines, said filter including
   a monolithic filter element having a plurality of interconnecting internal porous walls defining a plurality of small inlet passages extending adjacent a plurality of small outlet passages, said inlet and outlet passages being in communication through said porous walls for passing exhaust gases through said walls to filter particulates from the gases and deposit said particulates on the wall surfaces within the inlet passages, and the improvement comprising
   electric heating means in at least some of said passages to heat said passages and the surrounding portions of said element when energized and thereby raise the collected particulates in said portions of the element to their incineration temperature, thereby burning off the particulates from said portions and regenerating said portions of the element for continued use.

2. A self-regenerating monolithic exhaust particulate filter for diesel engines, said filter including
   a monolithic filter element having a plurality of interconnecting internal porous walls defining a plurality of small inlet passages extending adjacent a plurality of small outlet passages, said inlet and outlet passages being in communication through said porous walls for passing exhaust gases through said walls to filter particulates from the gases and deposit said particulates on the wall surfaces within the inlet passages, and the improvement comprising
   multiple electric heating means in at least some of said passages to heat said passages and the surrounding portions of said element when energized and thereby raise the collected particulates in said portions of the element to their incineration temperature, thereby burning off the particulates from said portions and regenerating said portions of the element for continued use, and
   means for selectively energizing various of said heating means in progressive sequence to regenerate various portions of said filter element while limiting the instantaneous requirement for supply of electrical heating energy.

3. A self-regenerating monolithic exhaust particulate filter for diesel engines, said filter including
   a monolithic filter element having a plurality of interconnecting internal porous walls defining a plurality of small inlet passages extending adjacent a plurality of small outlet passages, said inlet and outlet passages being in communication through said porous walls for passing exhaust gases through said walls to filter particulates from the gases and deposit said particulates on the wall surfaces within the inlet passages, and the improvement comprising
   multiple electric heating means in at least some of said passages to heat said passages and the surrounding portions of said element when energized and thereby raise the collected particulates in said portions of the element to their incineration temperature, thereby burning off the particulates from said portions and regenerating said portions of the element for continued use, means for selectively energizing various of said heating means in progressive sequence to regenerate various portions of said filter element while limiting the instantaneous requirement for supply of electrical heating energy, and means for selectively restricting gas flow through the inlet passages in those portions of the filter element subject to selective heating to reduce heat transfer out of the heated portions and thereby accomplish incineration of the collected particulates in said portions with a reduced expenditure of electrical energy.

4. The combination of any one of claims 1, 2, or 3, wherein said heating means comprises electric resistance heaters extending longitudinally in the inlet passages for substantially the full lengths thereof.

5. A combination according to claim 4, wherein said monolithic filter element is made of ceramic.

* * * * *

UNITED STATES PATENT AND TRADEMARK OFFICE
CERTIFICATE OF CORRECTION

PATENT NO. : 4,276,066
DATED : June 30, 1981
INVENTOR(S) : Kenneth B. Bly, Mark J. Gutwald, Otto A. Ludecke It is certified that error appears in the above—identified patent and that said Letters Patent is hereby corrected as shown below:

Title Page, [56] References Cited, Patent No. "3,758,778" should read -- 3,785,778 --.

Column 2, line 39, "selectively" should read -- separately --.

Column 3, line 33, "shielf" should read -- shield --.

Signed and Sealed this

Twenty-seventh Day of October 1981

[SEAL]

Attest:

GERALD J. MOSSINGHOFF

Attesting Officer *Commissioner of Patents and Trademarks*